Figure 1:
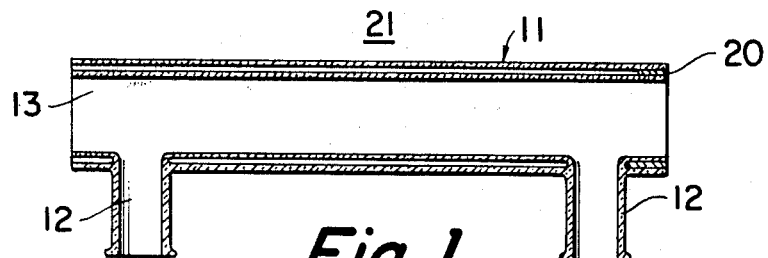

United States Patent

[11] 3,624,552

| [72] | Inventor | Charles A. Bennett<br>Camden, N.J. |
|---|---|---|
| [21] | Appl. No. | 849,281 |
| [22] | Filed | Aug. 5, 1969 |
| [45] | Patented | Nov. 30, 1971 |
| [73] | Assignee | The United States of America as represented by the Secretary of the Army<br>Continuation of application Ser. No. 635,984, May 2, 1967, now abandoned. This application Aug. 5, 1969, Ser. No. 849,281 |

[54] GLASS LASER COUPLING REFLECTOR
2 Claims, 5 Drawing Figs.

[52] U.S. Cl. .................................................... 331/94.5
[51] Int. Cl. .................................................... H01s 3/02, H01s 3/05, H01s 3/09
[50] Field of Search .......................................... 331/94.5

[56] References Cited
UNITED STATES PATENTS

| 3,349,339 | 10/1967 | Thorington................. | 331/94.5 |
| 3,358,243 | 12/1967 | Collins, Jr. et al. ............ | 331/94.5 |

FOREIGN PATENTS

| 1,019,907 | 2/1966 | Great Britain................ | 331/94.5 |

OTHER REFERENCES

Strong et al., Procedures in Exper. Physics, 1944, Prentice-Hall Inc., N. Y. pages 16– 21.

*Primary Examiner*—William L. Sikes
*Assistant Examiner*—R. J. Webster
*Attorneys*—Harry M. Saragovitz, Edward J. Kelly, Herbert Berl and S. Dubroff ABSTRACT: A method for fabricating a distortion-free glass laser device having generally concentric tubes, a reflective powder thereinbetween and port holes communicating between the tubes.

PATENTED NOV 30 1971

3,624,552

INVENTOR:
CHARLES A. BENNETT

BY: Harry M. Saragovitz,
Edward J. Kelly
Herbert Berl & S. Pickoff
ATTORNEYS

GLASS LASER COUPLING REFLECTOR

This is a continuation of Ser. No. 635,984 filed May 2, 1967, now abandoned.

This invention relates to glass articles, and more particularly concerns glassblowing techniques which eliminate distortions in the final glass product. In the course of developing apparatus for certain laser applications, it became apparent that the fabrication of a laser coupling glass reflector having a double-walled jacket, with side water ports sealed to the inner wall would be desirable so that the entire reflector body would also function as a cooling chamber. Enclosed between the walls would be a refractory powdered reflector, such as magnesium oxide. The inner tube would be precision bored comprising low thermal coefficient of expansion glass which would house the laser apparatus and serve as coolant carrier for the outside pumping source, and xenon lamp and ruby rod assembly. A reflector of this design would prove to be extremely valuable when used in conjunction with rapid-fire laser apparatus employing high-voltage flash lamps.

Many difficulties are presented in producing such a reflector. For example, severe physical dimensions and tolerances must be met and great care is required to prevent the formation of distortions in the precision bore tubing. This is extremely critical when fusing the coolant ports to the inner tube of the reflector, since the inner tube must house the actual laser apparatus. Since a close tolerance exists between the housing and laser apparatus, any distortions in the tubing could readily cause damage to the laser apparatus or prevent ease of entrance of the apparatus. Prior glassblowing techniques called for a hole the size of the port to be blown through the inner tube. The port could then be fused to the inner tube around the circumference of the hole. However, this mode of operation created undesirable distortions at the fused interface. Maintaining the concentricity of the inner and outer tubes while yet eliminating stress-strain buildup were also difficulties which must be overcome.

It is therefore an object of our invention to provide new and improved glassblowing techniques.

Another object of our invention is to provide a precision fabricated double-walled glass laser reflector.

Additional objects will become apparent as the invention is more fully hereinafter disclosed.

Figure 2:
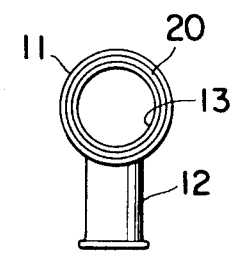
Figure 5:
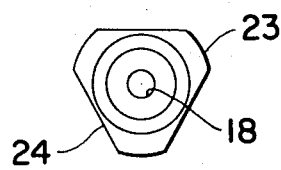
Figure 3:
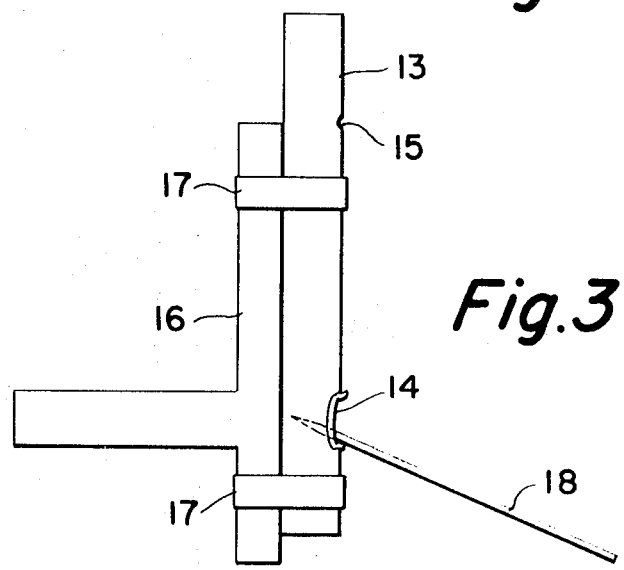
Figure 4:
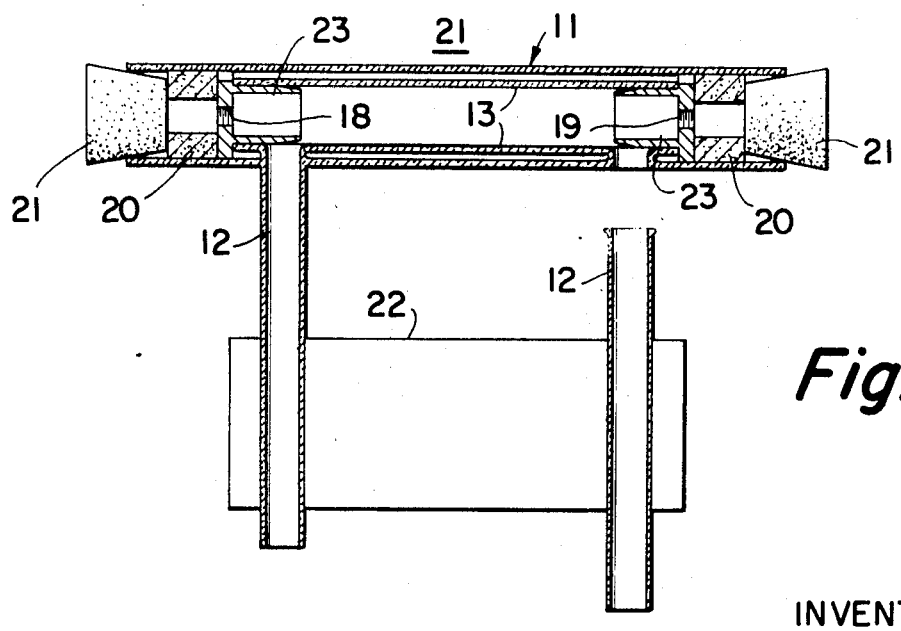

In order to fully illustrate the invention, reference is now made to the accompanying drawings wherein:

FIG. 1 shows a sectional view of one embodiment of the glass laser reflector body of our invention, FIG. 2 shows an end view of the glass laser reflector body of FIG. 1, FIG. 3 shows a step in the formation of a port hole of our reflector, and FIG. 4 shows a sectional view of the reflector prior to the fusing of the second port, FIG. 5 shows a front view of a graphite spacer.

Referring to the drawings and more particularly to FIG. 1 and 2 thereof, reflector 10 comprises inner tube 13 concentrically mounted within outer tube 11 with coolant ports 12 communicating therebetween. The area 20 between inner and outer tubes is preferably filled with magnesium oxide acting as a light reflector.

FIG. 3 depicts steps in the formation of the port holes 14 in the inner tube 13, which is secured to a tee jig 16 by straps 17. Pilot holes 15 are blown by means well known in the art and are then flared by means of a carbon rod 18. As shown in FIG. 4, after the port holes are formed the tubes are capable of being held in concentric relationship by means of a graphite plug 23, having an opening 19 for the passage of air. Asbestos collars 20 and rubber stoppers 21 are placed at the ends of the outer tube to act as seals for glassblowing while a jig 22 assists in applying the second port to the reflector assembly. FIG. 5 depicts a front view of the graphite spacer 23 having an air opening 19 and flats 24 cut from the outer diameter.

The example as set forth below establishes the dimensions required for a laser rod assembly approximately 5 ½ inches in length. The dimensions of the reflector may vary proportionally to changes in the dimensions of the laser rod assembly without varying the scope of the invention.

In accordance with one embodiment of my invention, precision bored glass tubing (0.75 ±0.002 inches) composed of Pyrex Brand Glass No. 7740, a trademark product of Corning Glass Works, comprising a low alkaline content borosilicate glass, comprises the inner tube. The tubing was cut oversize in order to provide a holding area while fabricating the two ports. For a final desired inner tube length of approximately 5 ½ inches, the tubing should be 7–8 inches in length.

Although the distance between ports and the port diameters may vary, it is preferable to have the ports 4 ¼ inch from center to center and approximately ½ inch in outside diameter. The pilot holes for the ports were intentionally made smaller than the final dimensions desired in order to prevent distortions in the tube. After the pilot holes were blown the tube was placed in the tee jig and the circumference of the pilot hole was flared to about ½ inch which was done by rotating the tube after it was heated, while at the same time pressing a pointed carbon rod against the edge of the hole. Flaring of the hole prevents distortions which usually arise in forming ports, and given a lip edge to use while sealing the inner tube to the inner surface of the outer tube. The height of the flare must be kept below 2 mm. because of the strict tolerance necessitated for the fitting of the inner tube into the outer tube and to prevent cracking while the ports are being sealed to the outer tube. The inner tube was then cut and ground on both ends to obtain a distance of 5.8 inches from either end to the center of the ends to obtain a distance of 5.8 inches from either end to the center of the nearest porthole. The hole will then be approximately 5 ½ inches in length and hence will secure the proper fitting for the inner apparatus.

A piece of precision bore tubing of Pyrex 7740 was also used for the outer tube jacket, which was about 1 inch in diameter and was cut oversize to a length of 8 inches. This tube must slide over the inner tube and flared portholes with a precise clearance between the two tubes of 2 mm. within 0.010 T.I.R. (Total Indicated Reading). This 2 mm. clearance and the concentricity of the tubes was maintained by graphite spacers until the apparatus is assembled. A hole was placed in the center of each graphite spacer, and was used for blowing air into the inner tube when making a ring seal at the flares. Three flats are also cut on the edges of each graphite plug to allow air to pass into the space between the two tubes. The inner tube was inserted into the outer tube and graphite plugs were placed between the tube, at each end to secure the position of the tubes.

Next, an asbestos collar and a rubber stopper were placed at one end of the outer jacket to hold the inner jacket in a fixed position, and to aid in making the seals during glassblowing. The collar was made from thick asbestos paper and was fitted between the graphite spacer and stopper. The asbestos paper must not contact the inner tube or stresses and strains might be produced during glassblowing and additionally, cracking during the cooling process might occur. Heat was then applied to the outer tubes to melt the glass above the port hole and permit a seal to remain at the point where the flare on the inner tube rested against or below the inner surface of the outer tube. In order to form a positive seal, and thus prevent pinholes from forming, the heated flare was worked in and out in an inhaling-exhaling technique through the end opening. After sealing the tubes together at the flared portions, the piece was kept warm and with a hotter flame applied at the outer surface where the seal was made, holes about ½ inch diameter were blown through the outer jacket.

While still keeping the area hot, a piece of glass tubing brought up to about the same temperature as the port area, was applied to the hole at the outer tube. The temperature of the port area and the port tubing was increased and a seal made at point of contact thus providing an opening through the port tubing and the outer wall into the inner wall. The flame was then lowered and the heated area permitted to drop slowly to a lower temperature in order to reduce stresses and strains set up by making the seal. The port tubing was about 6 inches long and had an outside diameter of 14 mm. The contact end had previously been flared with a pointed carbon rod to 16 mm. The flaring was done in order to surround the portholes during sealing, and hence prevent cracking.

The next step was to keep the piece warm while the other collar and stopper were put in place, and the assembly mounted on a wooden jig. The jig has two 14 mm. holes in it, one which held the already sealed tube, and the other which lined up the second piece of port tubing to be sealed with its porthole. The whole outer jacket was warmed slowly and the second seal was made. The sealing was similar to the first, except that the blowing was done through the first port already sealed rather than through an end opening.

After these seals were completed all supporting structures were removed and the entire device was placed into an annealing oven and preheated to 350° F. The oven was set to reach the annealing temperature of 1050° F. and the device was thus heated slowly to this temperature. When the device or piece reached the annealing temperature, the oven was shut off and the reflector allowed to cool within the oven. In this manner, no cracks propagated because of sudden changes in temperature. After cooling, the space between the inner and outer walls can be packed with powder and the ends of cavity 20 sealed with an appropriate elastomer.

While the particular method as described herein is well adapted to meet the objects of the present invention, various modifications or changes may be resorted to without departing from the scope of the invention as defined in the claims.

I claim:

1. A rapid-fire, double-jacketed glass laser coupling reflector comprising an outer precision bored glass tube, an inner precision bored glass tube mounted concentrically within said outer tube and providing an air space therebetween, an entrance cooling port communicating with said inner tube through said outer tube adjacent one end of said concentric tubes, an exit cooling port communicating with said inner tube through said outer tube adjacent the other end of said concentric tubes, said ports communicating with each other through said inner tube and being sealingly mounted in airtight relation to each of said concentric tubes, a refractory reflecting powder sealingly disposed within and filling said space between said tubes and isolated from cooling media passing through said ports.

2. The device of claim 1 further characterized by said powder being magnesium oxide.

* * * * *